(12) United States Patent
Brandt

(10) Patent No.: US 7,887,081 B2
(45) Date of Patent: Feb. 15, 2011

(54) COMBINATION OF A SKI BOOT AND SKI

(75) Inventor: Helmut Brandt, Leopoldsdorf (AT)

(73) Assignee: Tyrolia Technology GmbH (AT)

( * ) Notice: Subject to any disclaimer, the term of this patent is extended or adjusted under 35 U.S.C. 154(b) by 598 days.

(21) Appl. No.: 11/576,517

(22) PCT Filed: Oct. 2, 2004

(86) PCT No.: PCT/EP2004/011038

§ 371 (c)(1),
(2), (4) Date: Jan. 14, 2008

(87) PCT Pub. No.: WO2006/037357

PCT Pub. Date: Apr. 13, 2006

(65) Prior Publication Data

US 2008/0196275 A1    Aug. 21, 2008

(51) Int. Cl.
*A63C 5/00* (2006.01)
(52) U.S. Cl. ............................ 280/617; 36/117.7
(58) Field of Classification Search ............ 280/611, 280/601, 633, 616–618, 623, 613; 36/117.1–119.1
See application file for complete search history.

(56) References Cited

U.S. PATENT DOCUMENTS

| | | | |
|---|---|---|---|
| 3,852,896 A | 12/1974 | Pyzel et al. | |
| 3,987,533 A | 10/1976 | Sandgren | |
| 4,078,322 A | 3/1978 | Dalebout | |
| 4,083,128 A * | 4/1978 | Rossman | 36/97 |
| 4,141,570 A | 2/1979 | Sudmeier | |
| 4,177,584 A * | 12/1979 | Beyl | 280/613 |
| 4,245,409 A | 1/1981 | Beyl | |
| 4,408,779 A | 10/1983 | Shekter | |

(Continued)

FOREIGN PATENT DOCUMENTS

DE    199 36 519 A1    2/2001

(Continued)

OTHER PUBLICATIONS

English translation of International Preliminary Examination Report on Patentability.

(Continued)

*Primary Examiner*—J. Allen Shriver, II
*Assistant Examiner*—Erez Gurari
(74) *Attorney, Agent, or Firm*—Ostrolenk Faber LLP

(57) ABSTRACT

The invention relates to a combination of ski boots of various sizes and skis with a fitted binding, comprising a toe jaw and a heel jaw, the relative separation of which may be altered and fixed relative to the ski by means of a guide device arranged on the ski. The ski boots belong to at least two ski boot types (1, 1', 1"), which differ in the length of the sole (a, b, c), each of which are suitable for the fitting of inner boots (3$a$ to 3$d$, 3'$a$ to 3'$d$, 3"$a$ to 3"$d$) in at least two boot sizes. The skis comprise binding jaws, arranged to be adjustable such that the relative separation thereof may be matched to the differing lengths of sole, whereby markings on the types of ski boot and markings on the guide device of the binding permit an unambiguous matching of the sole length to the corresponding jaw separation.

28 Claims, 2 Drawing Sheets

U.S. PATENT DOCUMENTS

| | | | |
|---|---|---|---|
| 5,071,154 | A | 12/1991 | Szasz et al. |
| 5,261,688 | A | 11/1993 | Rohrmoser |
| 5,273,305 | A | 12/1993 | Erdei et al. |
| 5,344,178 | A | 9/1994 | Rohrmoser |
| 5,498,017 | A * | 3/1996 | Rohrmoser ............... 280/633 |
| 5,575,496 | A * | 11/1996 | Luitz et al. ............... 280/618 |
| 6,471,235 | B1 * | 10/2002 | Luitz et al. ............... 280/618 |
| 6,779,810 | B1 | 8/2004 | Mangold |
| 2002/0092182 | A1 | 7/2002 | Coplon et al. |
| 2002/0113413 | A1 | 8/2002 | Sosin et al. |

FOREIGN PATENT DOCUMENTS

| | | |
|---|---|---|
| GB | 1 214 738 | 12/1970 |
| WO | 96/13183 | 2/1996 |
| WO | 02/47776 | 6/2002 |

OTHER PUBLICATIONS

The present application is related to U.S. Appl. No. 10/580,304 filed May 22, 3006. An IDS was filed in that case on Feb. 9, 2010. The Examiner is requested to review the file history and all of the prior art of record in the '304 application.

Opposition paper filed in the EPO by Salomon SAS on Oct. 14, 2009, against European Patent EP 1 687 072 B1 of the applicant Tyrolia Technology GmbH, which corresponds to U.S. Appl. No. 10/580,304 filed May 22, 2006.

Atomic Tech Manual 2002/03 catalogue, published on Feb. 2, 2002.

Atomic Alpine Collection 2002/03 catalogue, published on Feb. 2, 2002.

Oxygen 2002/03 catalogue, published on Feb. 2, 2002.

Atomic Rental-System catalogue, published on Feb. 1, 2003.

International Search Report with English Language Translation.

* cited by examiner

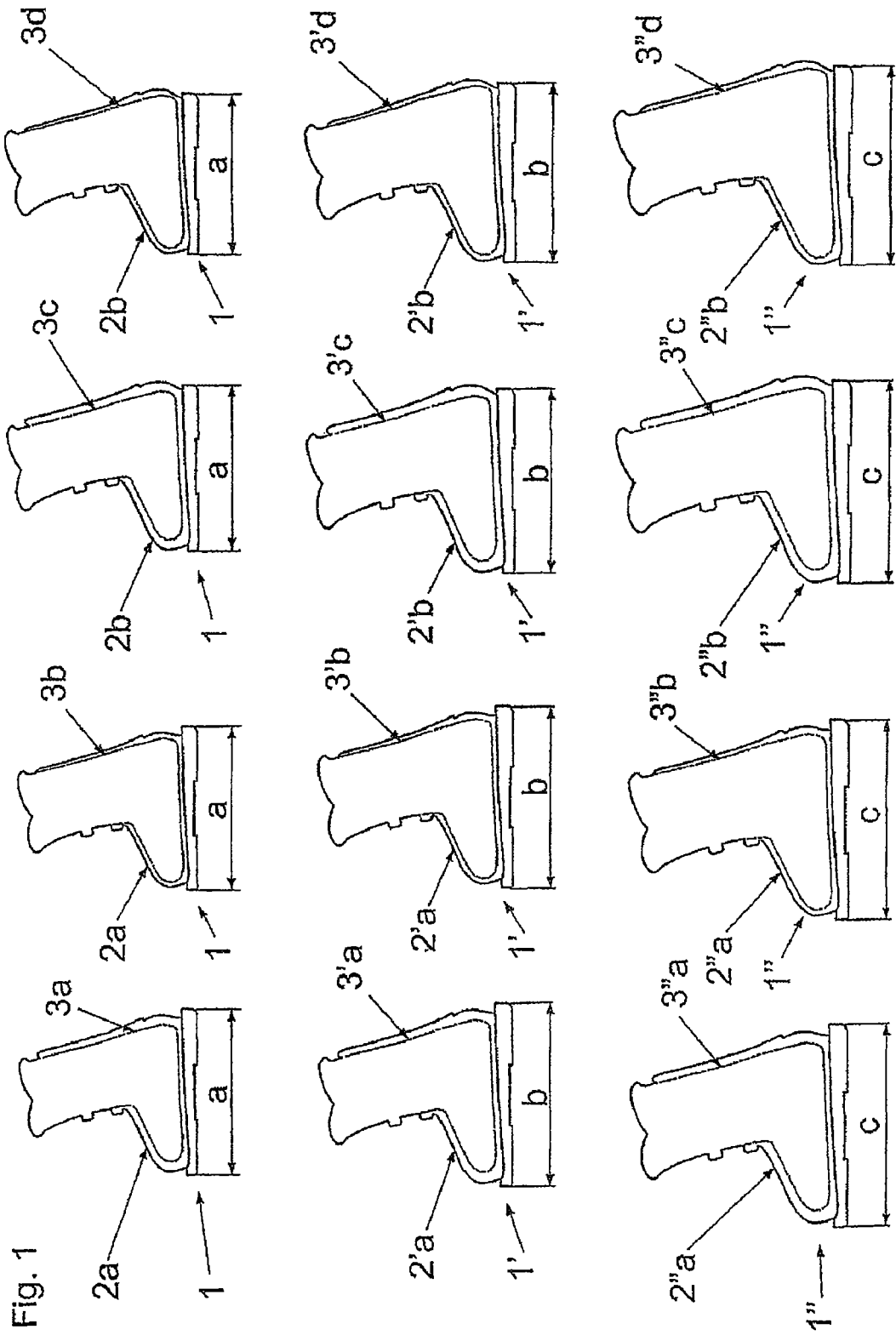

COMBINATION OF A SKI BOOT AND SKI

CROSS REFERENCE TO RELATED APPLICATION

The present application is a 35 U.S.C. §371 national phase conversion of PCT/EP2004/011038 filed Oct. 2, 2004, which is incorporated herein in its entirety. This application is related to Ser. No. 10/580,304, filed May 22, 2006, which is the U.S. National Phase of PCT/EP2003/013175 filed Nov. 24, 2003.

BACKGROUND OF THE INVENTION

1. Field of the Invention

The invention relates to a combination of different-sized ski boots and skis with fitted bindings which have a front jaw and a heel jaw and the spacing between which can be changed, and secured in relation to the ski, by means of at least one guide device arranged on the ski.

2. Background Art

Ski-hire outlets are usually provided, in accordance with requirements, with a number of skis of different types and lengths with pre-fitted ski bindings. The package is completed by different-sized ski boots. The ski bindings are arranged on the ski by means of suitable mechanisms such that the spacing between the two binding jaws can be adjusted within a relatively wide range in order to adapt the binding to ski boots of different lengths. This requires time-consuming adjustment work on the part of the staff in the ski-hire outlets. Ski-hire outlets thus also require well-trained staff.

SUMMARY OF THE INVENTION

This is where the invention comes in, this invention being based on the object of providing a combination of skis with pre-fitted bindings and different-sized ski boots which is particularly suitable for a hiring system, reduces the amount of adjustment work required and ensures straightforward, time-saving and purely organized proceedings for the customers and the staff in the ski-hire outlet.

The set object is achieved according to the invention by a combination comprising ski boots which belong to at least two ski-boot types, differ from one another in terms of the sole length and are suitable for the insertion of inner boots in at least two boot sizes, and binding jaws which are arranged in an adjustable manner on the ski such that the spacing between them can be adapted to the different sole lengths, markings on the ski-boot types and markings on the guide device of the binding allowing the sole length to be clearly assigned to the appropriate jaw spacing.

Combinations according to the invention are optimally suited to ski-hire outlets. The invention allows simple adaptation of the binding to the boots of the ski-boot types provided. This makes the task of the staff in the ski-hire outlet easier and has the advantage, in particular, of saving the customer time when hiring out the equipment.

According to a preferred embodiment of the invention, the markings are colored markings, the ski-boot types of a certain sole length being marked by color such that this color corresponds to the color of the marking(s) on the guide device of the binding corresponding to the appropriate spacing between the jaws.

The invention covers a multiplicity of combinations, of which some are particularly advantageous. It is also an important factor here, in particular, for it to be possible, while having good organization, to provide, as far as possible, all the desired ski-boot sizes. In this context, it is advantageous if a combination according to the invention has at least three ski-boot types and each ski-boot type comprises a plurality of different-sized shells, which nevertheless have corresponding sole lengths.

In the case of three or more different ski-boot types, it is advantageous if each ski-boot type comprises two different-sized shells. In this case, the combination according to the invention can be configured particularly straightforwardly such that all the ski-boot sizes which are usually required can be made available.

For this purpose, for example, a plurality of, in particular two, shells of each shell size of a ski-boot type are made available, it being possible for just one inner boot of a certain size to be inserted into each of these shells. These same-sized shells are configured, in particular, such that an inner boot of a certain size fits into the one shell and an inner boot of the next or closest size can be inserted into the other of these shells. There are thus shells of the same size which have different interiors. This can easily be achieved in that, for example of two same-sized shells, one is adapted to a smaller-sized inner boot by the insertion of an insert or the like. A variety of different combinations according to the invention are thus possible. Of course, the ski-hire outlets will provide pairs of ski-boot shells and inner boots in the appropriate numbers and sizes.

The important factor for the customer, in particular, is being able to hire out the appropriate combination of ski boots and skis as quickly as possible. It is thus advantageous if the ski-boot types and the shells thereof as well as the inner boots and the skis can be assigned to one another by means of corresponding codes or markings and the like.

BRIEF DESCRIPTION OF THE DRAWINGS

Further features, advantages and details of the invention will be described more specifically with reference to the drawing, which illustrates an exemplary embodiment in schematic form and in which: FIG. 1 shows ski boots belonging to one embodiment of a combination according to the invention.

DETAILED DESCRIPTION OF EMBODIMENTS OF THE INVENTION

Figure 2A:
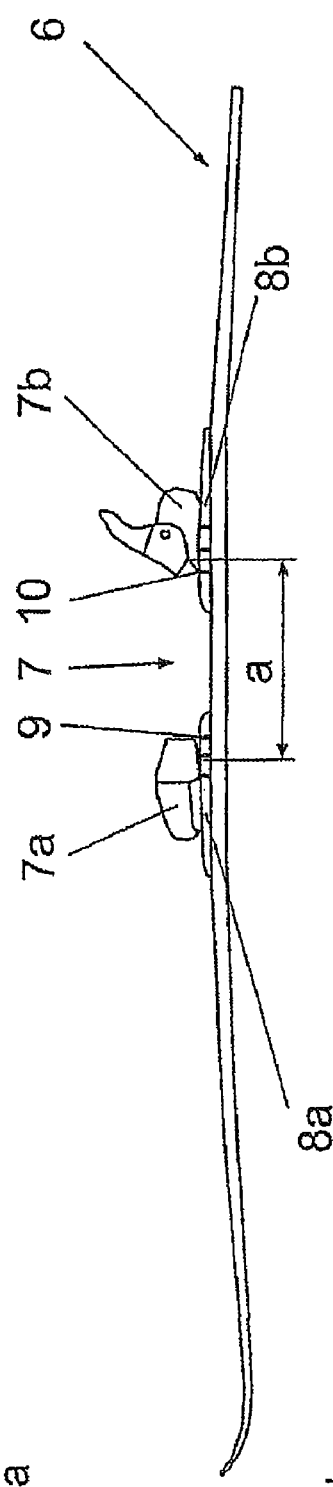
FIGS. 2a to 2c show a ski belonging to one embodiment of a ski-hire system according to the invention.

The essential constituent parts of a combination according to the invention comprising ski boots and skis with bindings for a ski-hire system used for downhill skiing are constituted by at least two, and in the embodiment illustrated three, different ski-boot types 1, 1', 1". A respective ski-boot type 1, 1', 1" comprises two smaller outer shells 2a, 2'a, 2"a and two larger outer shells 2b, 2'b, 2"b. The shells 2a, 2b and 2'a, 2'b and 2"a, 2"b belonging to each boot type 1, 1', 1" have a corresponding sole length a, b, c in each case. The two outer shells 2a are of the same size at least externally, in particular they are of corresponding configuration. This also applies to the rest of the pairs of outer shells 2b, 2'a, 2'b, 2"a, 2"b of the same size.

The two same-sized shells 2a of the boot type 1 are configured internally such that the one shell 2a can accommodate, for example, an inner boot 3a of size 23 and the associated half size, and the second shell 2a can accommodate an inner boot 3b of size 24 and the associated half size. For this purpose, at least one insert may be introduced into the one shell 2a provided for the smaller inner boot of size 23, in order to adapt the interior of the shell 2a to the smaller inner boot. The same applies to the two outer shells 2b and the inner boots 3c, 3d which can be inserted therein, these inner boots corresponding, for example, to boot sizes 25 and 26.

The insert, which reduces the size of the interior of a shell and is adapted to an inner boot of a certain size, may be in one or more pieces and is produced, in particular, from plastic. A preferred embodiment, furthermore, is one in which the insert lines the toe region of the interior and those lateral regions of the inner sides of the shell which adjoin the sole.

All the outer shells 2'a and 2'b belonging to the ski-boot type 1' have the sole length b and, as has already been mentioned, are of different sizes. For example an inner boot 3'a of boot size 27 and one of the associated half size can be inserted into the one outer shell 2'a, which, as has likewise been mentioned, is correspondingly adapted internally, for example, via an insert, and an inner boot 3'b of size 28 and the associated half size can be inserted into the second outer shell 2'a. The same applies to the two shells 2'b and the inner boots 3'c, 3'd which can be inserted therein, it being possible for these inner boots to correspond to boot sizes 29 and 30. It is also the case for the ski boots of boot type 1" that the same applies in respect of the pairs of outer shells 2"a, 2"b and in respect of the inner boots 3"a to 3"d which can be inserted therein, it being possible for these inner boots to correspond to boot sizes 31 to 34.

Figure 2B:
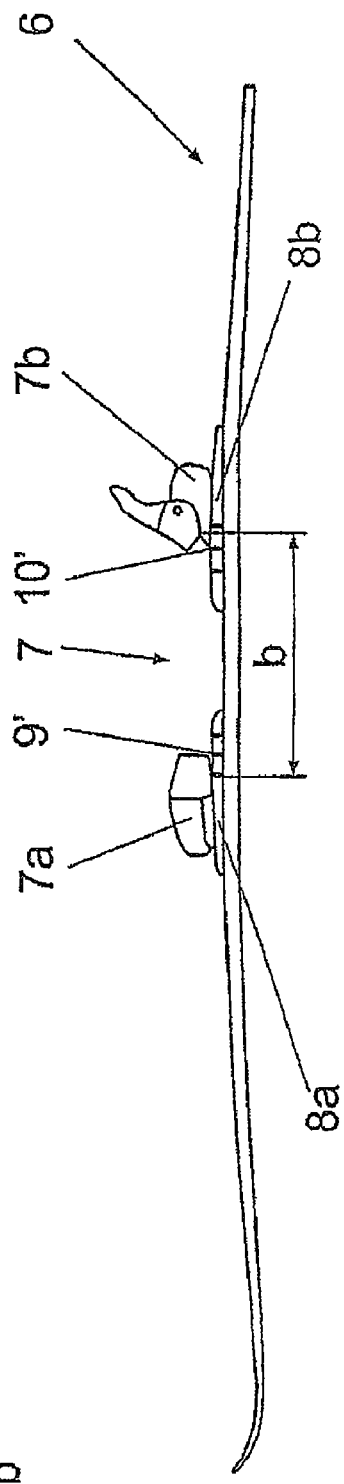
Figure 2C:
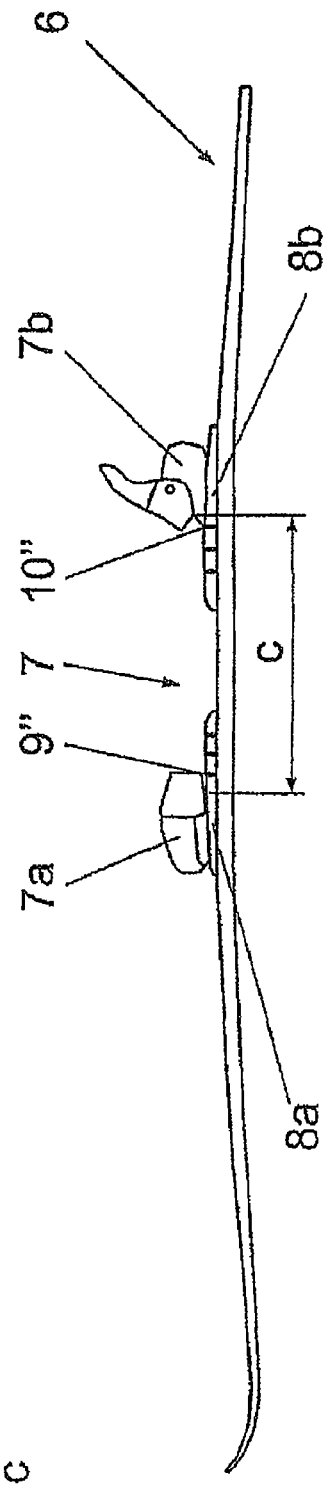

FIGS. 2a to 2c show a ski 6 belonging to a pair of skis, having a fitted ski binding 7 comprising a respective front jaw 7a and a heel jaw 7b. The front jaw 7a is positioned on a guide device 8a, for example a guide rail, arranged on the top side of the ski 6, for example screwed or connected in some other way to the ski 6, and it can be secured in different positions in the longitudinal direction of the ski by means of an adjusting and latching device (not illustrated) which can be configured in a conventional manner. The same applies to the heel jaw 7b and the guide device 8b, on which the heel jaw 7b is arranged. Markings 9, 9', 9" are provided on the guide device 8a and markings 10, 10', 10" are provided on the guide device 8b. Positioning and latching the front jaw 7a in accordance with the marking 9, and the heel jaw 7b in accordance with the marking 10, correspond to a spacing between the jaws 7a, 7b which is suitable for the insertion of a ski-boot type 1 of sole length a. Positioning and latching the jaws 7a, 7b in accordance with the markings 9', 10' correspond to a spacing which allows insertion of a ski-boot type 1' of length b, and positioning and latching of the jaws 7a, 7b in accordance with the markings 9" and 10" allow insertion of a ski-boot type 1" of length c.

The markings may be colored elements, for example marking lines on the guide device or some other binding part which remain stationary in relation to the ski, it also being possible for the ski boots which can be inserted to correspond to the spacing between the jaws 7a, 7b to be marked by corresponding color. The colored marking of the ski boot can be done as required, for example in the region of the boot toe, and may also be a dedicated component. For example, red markings 9, 10 and a red marking on boots of sole length a allow skis and boots to be assigned to one another in a straightforward manner.

As an alternative to the two binding jaws 7a, 7b being capable of adjustment, it is also possible to provide for just one of the jaws 7a, 7b, preferably the heel jaw 7b, to be arranged such that it can be adjusted in the longitudinal direction of the ski. In respect of the markings for adjusting or adapting the spacing between the jaws 7a, 7b to the sole lengths a, b, c of the ski-boot types 1, 1', 1", the same applies as to what has been said above.

In the case of a further embodiment (not illustrated), it may be provided that one of the jaws 7a, 7b, preferably the heel jaw 7b, can be adjusted and secured in relation to the guide device 8b and the front jaw 7a can be coupled for movement to the heel jaw 7b, for example via racks meshing with a gearwheel, so that a change in the position of the heel jaw 7b results in the position of the front jaw 7a being changed synchronously. The markings may be arranged and configured in a manner analogous to the embodiment according to FIGS. 2a to 2c. In the case of a modification to this embodiment, provision may also be made to arrange the latching device for securing the spacing between 7a and 7b in the region between the jaws.

Combinations according to the invention for ski-hire systems comprise at least two, preferably three or even more than three, ski-boot types and/or more than two different-sized shells of the same sole length for each ski-boot type. It should further be mentioned that it is also possible to use different ski-binding systems within the context of a ski-hire system according to the invention, as long as appropriate binding-attachment regions for the ski-boot shells are provided.

It is particularly advantageous that the invention makes it possible, in addition, to provide conventional means of adjustment to any desired ski-boot lengths for bindings, those adjustments of the spacing between the jaws which are appropriate for the ski-boot types according to the invention having specific markings, as has been described above.

Although the present invention has been described in relation to particular embodiments thereof, many other variations and modifications and other uses will become apparent to those skilled in the art. Therefore, the present invention is not limited by the specific disclosure herein.

The invention claimed is:

1. A combination of different-sized ski boots and skis with fitted bindings which have a front jaw and a heel jaw and the spacing between which can be changed, and secured in relation to the ski, by at least one guide device arranged on the ski,
   characterized by ski boots which belong to at least two ski-boot types, which differ from one another in terms of the sole length,
   at least two different-sized shells, each having predetermined, fixed outer dimensions being provided for each ski-boot type of a certain sole length, and for each of said shells, a respective set of inner boots, said inner boots being configured to fit the interiors of the corresponding said shells, and
   binding jaws which are arranged in an adjustable manner on the ski such that the spacing between them can be adapted to different sole lengths, markings on the ski-boot types and markings on the guide device of the binding allowing the sole length to be clearly assigned to an appropriate jaw spacing.

2. The combination as claimed in claim 1, characterized in that the markings are colored markings, the ski-boot types of a certain sole length being marked by color such that this color corresponds to the color of the marking(s) on the guide device of the binding, corresponding to the appropriate spacing between the jaws.

3. The combination as claimed in claim 1, characterized in that there are at least three ski-boot types which differ from one another in terms of the sole length.

4. The combination as claimed in claim 1, characterized in that each ski-boot type comprises a plurality of different-sized shells of the same sole length.

5. The combination as claimed in claim 4, characterized in that each ski-boot type comprises two different-sized shells.

6. The combination as claimed in claim 1, characterized in that a plurality of shells of each shell size are provided, and these differ from one another internally such that a respective inner boot of a certain size can be inserted.

7. The combination as claimed in claim 6, characterized in that an inner boot of a certain size fits into the one shell of same-sized shells and an inner boot of the next or closest size fits into the other shell.

8. A combination of different-sized ski boots and skis with fitted bindings which have a front jaw and a heel jaw and the spacing between which can be changed, and secured in relation to the ski, by at least one guide device arranged on the ski,
    characterized by ski boots which belong to at least two ski-boot types, which differ from one another in terms of the sole length,
    at least two different-sized shells being provided for each ski-boot type of a certain sole length, and for each of said shells, a respective set of inner boots, said inner boots being configured to fit the interiors of the corresponding said shells,
    binding jaws which are arranged in an adjustable manner on the ski such that the spacing between them can be adapted to different sole lengths, markings on the ski-boot types and markings on the guide device of the binding allowing the sole length to be clearly assigned to an appropriate jaw spacing,
    characterized in that a plurality of shells of each shell size are provided, and these differ from one another internally such that a respective inner boot of a certain size can be inserted; and
    characterized in that at least one of the same-sized shells is adapted to a smaller-sized inner boot by the insertion of an insert.

9. The combination as claimed in claim 1, characterized in that the ski-boot types and the shells thereof, the inner boots and the skis are assigned to one another by means of codes, markings or the like.

10. The combination as claimed in claim 6, characterized in that two shells of each shell size are provided, and these differ from one another internally such that a respective inner boot of a certain size can be inserted.

11. The combination as claimed in claim 4, characterized in that for each ski-boot type of a certain sole length, at least three shells of different sizes are provided.

12. A method of providing a combination of different-sized ski boots and skis with fitted bindings which have a front jaw and a heel jaw and the spacing between which can be changed, and secured in relation to the ski, by at least one guide device arranged on the ski, comprising
    providing ski boots which belong to at least two ski-boot types, which differ from one another in terms of the sole length,
    providing at least two different-sized shells, each having predetermined, fixed outer dimensions for each ski-boot type of a certain sole length, and providing for each of said shells, a respective set of inner boots, said inner boots being configured to fit the interiors of the corresponding said shells, and
    binding jaws which are arranged in an adjustable manner on the ski such that the spacing between them can be adapted to different sole lengths, markings on the ski-boot types and markings on the guide device of the binding allowing the sole length to be clearly assigned to an appropriate jaw spacing.

13. The method as claimed in claim 12, characterized in that the markings are colored markings, the ski-boot types of a certain sole length being marked by color such that this color corresponds to the color of the marking(s) on the guide device of the binding, corresponding to the appropriate spacing between the jaws.

14. The method as claimed in claim 12, characterized in that there are at least three ski-boot types which differ from one another in terms of the sole length.

15. The method as claimed in claim 12, characterized in that each ski-boot type comprises a plurality of different-sized shells of the same sole length.

16. The method as claimed in claim 15, characterized in that for each ski-boot type of a certain sole length, at least three shells of different sizes are provided.

17. The method as claimed in claim 15, characterized in that each ski-boot type comprises two different-sized shells.

18. The method as claimed in claim 12, characterized in that a plurality of shells of each shell size are provided, and these differ from one another internally to receive a respective inner boot of a certain size.

19. The method as claimed in claim 18, characterized in that two shells of each shell size are provided, and these differ from one another internally to receive a respective inner boot of a certain size.

20. The method as claimed in claim 18, characterized in that an inner boot of a certain size fits into the one shell of same-sized shells and an inner boot of the next or closest size fits into the other shell.

21. A method of providing a combination of different-sized ski boots and skis with fitted bindings which have a front jaw and a heel jaw and the spacing between which can be changed, and secured in relation to the ski, by at least one guide device arranged on the ski, comprising
    providing ski boots which belong to at least two ski-boot types, which differ from one another in terms of the sole length,
    providing at least two different-sized shells for each ski-boot type of a certain sole length, and providing for each of said shells, a respective set of inner boots, said inner boots being configured to fit the interiors of the corresponding said shells,
    binding jaws which are arranged in an adjustable manner on the ski such that the spacing between them can be adapted to different sole lengths, markings on the ski-boot types and markings on the guide device of the binding allowing the sole length to be clearly assigned to an appropriate jaw spacing;
    characterized in that a plurality of shells of each shell size are provided, and these differ from one another internally to receive a respective inner boot of a certain size; and
    characterized in that at least one of the same-sized shells is adapted to a smaller-sized inner boot by the insertion of an insert.

22. The method as claimed in claim 12, characterized in that the ski-boot types and the shells thereof, the inner boots and the skis are assigned to one another by means of codes, markings or the like.

23. A combination of different-sized ski boots and skis with fitted bindings which have a front jaw and a heel jaw and the spacing between which can be changed, and secured in relation to the ski, by at least one guide device arranged on the ski,
    characterized by ski boots which belong to at least two ski-boot types, which differ from one another in terms of the sole length, at least two different-sized shells being provided for each ski-boot type of a certain sole length, and for each of said shells, a respective set of inner boots, said inner boots being configured to fit the interiors of the corresponding said shells, binding jaws which are arranged in an adjustable manner on the ski such that the spacing between them can be adapted to different sole lengths, markings on the ski-boot types and markings on the guide device of the binding allowing the sole length to be clearly assigned to an appropriate jaw spacing; and wherein each of said respective sets of inner boots corresponding to the at least two different-sized shells provided for each ski-boot type, comprises at least two sets of inner boots, having respectively one boot size and an associated half size.

24. A method of providing a combination of different-sized ski boots and skis with fitted bindings which have a front jaw and a heel jaw and the spacing between which can be changed, and secured in relation to the ski, by at least one guide device arranged on the ski, comprising providing ski boots which belong to at least two ski-boot types, which differ from one another in terms of the sole length, providing at least two different-sized shells for each ski-boot type of a certain sole length, and providing for each of said shells, a respective set of inner boots, said inner boots being configured to fit the interiors of the corresponding said shells, binding jaws which are arranged in an adjustable manner on the ski such that the spacing between them can be adapted to different sole lengths, markings on the ski-boot types and markings on the guide device of the binding allowing the sole length to be clearly assigned to an appropriate jaw spacing;

wherein each of said respective sets of inner boots, corresponding to the at least two different-sized shells provided for each ski-boot type, comprises at least two sets of inner boots, having respectively one boot size and an associated half size.

25. The combination as claimed in claim 4, further characterized in that each ski-boot type comprises more than two different-sized shells of the same sole length.

26. The combination as claimed in claim 6, further characterized in that each ski-boot type comprises more than two different-sized shells of the same sole length.

27. The method as claimed in claim 15, further characterized in that each ski-boot type comprises more than two different-sized shells of the same sole length.

28. The method as claimed in claim 18, further characterized in that each ski-boot type comprises more than two different-sized shells of the same sole length.

\* \* \* \* \*